United States Patent
Euget et al.

(10) Patent No.: US 7,962,133 B2
(45) Date of Patent: *Jun. 14, 2011

(54) METHOD AND APPARATUS FOR THE ORDERING OF CARRIER LINKS

(75) Inventors: Guy Euget, Vence (FR); Jean-Francois Pennec, Nice (FR)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/641,912

(22) Filed: Dec. 18, 2009

(65) Prior Publication Data

US 2010/0128737 A1    May 27, 2010

Related U.S. Application Data

(63) Continuation of application No. 11/478,894, filed on Jun. 30, 2006, now Pat. No. 7,660,596.

(51) Int. Cl.
*H04Q 7/20* (2006.01)

(52) U.S. Cl. .......... 455/426.2; 455/414.1; 455/509; 455/510; 370/270; 370/252

(58) Field of Classification Search .......... 455/510, 455/509, 515, 405, 406, 404.2, 456.1, 456.2, 455/432, 500, 456.6, 422, 426.2, 414.1; 370/431, 370/252, 328, 255, 486, 270; 709/228; 713/176, 165, 181, 167, 187; 705/54, 51, 52

See application file for complete search history.

(56) References Cited

U.S. PATENT DOCUMENTS

| | | | |
|---|---|---|---|
| 6,633,547 B1 * | 10/2003 | Akatsu et al. | 370/255 |
| 7,133,845 B1 * | 11/2006 | Ginter et al. | 705/51 |
| 7,143,066 B2 * | 11/2006 | Shear et al. | 705/54 |
| 7,281,133 B2 * | 10/2007 | Ginter et al. | 713/176 |
| 7,660,596 B1 * | 2/2010 | Euget et al. | 455/510 |
| 2007/0097884 A1 * | 5/2007 | Chewning et al. | 370/254 |

* cited by examiner

*Primary Examiner* — Tan Trinh

(57) ABSTRACT

A method and apparatus for provisioning a physical link to a service provider is disclosed whereby physical link information in a carrier network is store, in one embodiment, in a database within the carrier network or, in another embodiment, in a database shared by a carrier and a service provider. In response to a request from the service provider for the use of the physical link, physical link information and network management information associated is retrieved from that database. In one embodiment, this information is sent directly from the carrier via in-band signaling. In another embodiment, the information is retrieved from the shared database and is transmitted via out-of-band signaling. In accordance with yet another embodiment, messages exchanged between service providers and carriers comprise digital certificates that are used to verify the identity of the providers and carriers.

20 Claims, 6 Drawing Sheets

METHOD AND APPARATUS FOR THE ORDERING OF CARRIER LINKS

This application is a continuation of prior application Ser. No. 11/478,894 filed Jun. 30, 2006, now U.S. Pat. No. 7,660,596 which is incorporated herein by reference.

BACKGROUND OF THE INVENTION

The present invention relates generally to the ordering and provisioning of physical layer links in telecommunication networks and, more particularly, to the service provider ordering of such links.

In providing telecommunication service to customers different service providers may use different carriers to provide the physical links between different nodes in a network. These carriers typically maintain separate physical network infrastructures/links for carrying voice and data communications traffic. Such physical links are typically capable of being interconnected in order to provide seamless service to customers of a service provider. Thus, for example, a communication session originating from one carrier's infrastructure may traverse one or more other carriers' networks along the path from a source to a destination. In order to create these paths, service providers must provision physical links between and across the various networks.

For example, many corporate networks span a wide geographic area and, as a result, frequently require different carriers to operate together to achieve the necessary physical connectivity between various locations. Prior methods of establishing these interconnections are typically inefficient and require a relatively long period of time to complete. This is due, in part, to the fact that each carrier typically manages administrative and technical information related to the links within the physical network it controls using different, usually proprietary, methods and formats. Accordingly, whenever a service provider or one carrier requires the use of resources, such as the physical lines owned and operated by another carrier, manual negotiations via, for example, telephone, e-mail or postal service mail between the network management entities of the carriers and service providers must take place to establish the specific terms of the use of those lines. Additionally, once an agreement is reached over the use of these lines, there is typically some delay incurred during which the owner of the lines physically builds or logically establishes the necessary connections.

Once the physical connections are created and service is initiated between the links of different carriers, other inefficiencies and delays can arise due to the manual nature of managing the interconnected network. For example, frequent manual information exchanges (via, once again, telephone, or postal mail) between the service provider and/or carrier network management entities, such as information related to the status, maintenance and lifetime management of the links, are necessary to utilize and manage the bandwidth of the links. However, such manual information exchanges are subject to mistakes and/or misunderstandings that may lead to a misallocation of resources and/or actions that delay establishing a link or otherwise detract from the service to the customer.

Various automated network management tools have been implemented to monitor network status and performance and to eliminate the need for unnecessary manual exchanges of information. However, these tools are limited in their ability to monitor the physical links of various interconnected networks. For example, many such tools were designed primarily to monitor events and control traffic in the network layer and data link layer (i.e., layers 2 and 3) of the networks. As is well understood, these layers are layers within the Open System Interconnection (OSI) model of networks that generally defines 7 different layers in the network. Layer 1 in the OSI model, also known as the physical layer, is the layer that actually conveys a bit stream (i.e., electrical impulse, light or radio signals) through the network at the electrical and mechanical level. This layer consists of the hardware necessary to send and receive data on a carrier signal. Layer 2, also known as the data link layer, is the layer at which the physical medium is shared and where data link and media access to various devices is controlled. For example, in Ethernet networks, layer 2 is the layer at which network routing between media access control (MAC) addresses of individual hardware components is performed. Finally, layer 3 of a network, also known as the network layer, provides switching and routing technologies to create logical paths, known as virtual circuits for transmitting data from one network node to another. Routing and forwarding of communications traffic are performed at this layer, as are addressing, internetworking, error handling, congestion control and packet sequencing functions. Many network management tools used to monitor and control traffic at the network and data link layers of the network do not consider the physical layer (layer 1) and, as a result, management of this layer across interconnected carrier networks is difficult.

SUMMARY OF THE INVENTION

The present inventors have recognized that there is a need for integrated network management between different carriers that integrates the physical layer infrastructure. In particular, the present inventors have invented a method and apparatus for provisioning a physical link to a service provider whereby physical link information in a carrier network is stored in a database either within the carrier network or, in another embodiment, in a database shared by a carrier and a service provider. Then, in response to a request from the service provider for the use of the physical link, physical link information and network management information is retrieved from that database. In one embodiment, this information is sent directly from the carrier via in-band signaling. In another embodiment, the information is retrieved from the shared database and is transmitted via out-of-band signaling. In accordance with yet another embodiment, messages exchanged between service providers and carriers comprise digital certificates that are used to verify the identity of the providers and carriers.

These and other advantages of the invention will be apparent to those of ordinary skill in the art by reference to the following detailed description and the accompanying drawings.

DETAILED DESCRIPTION

Figure 1:
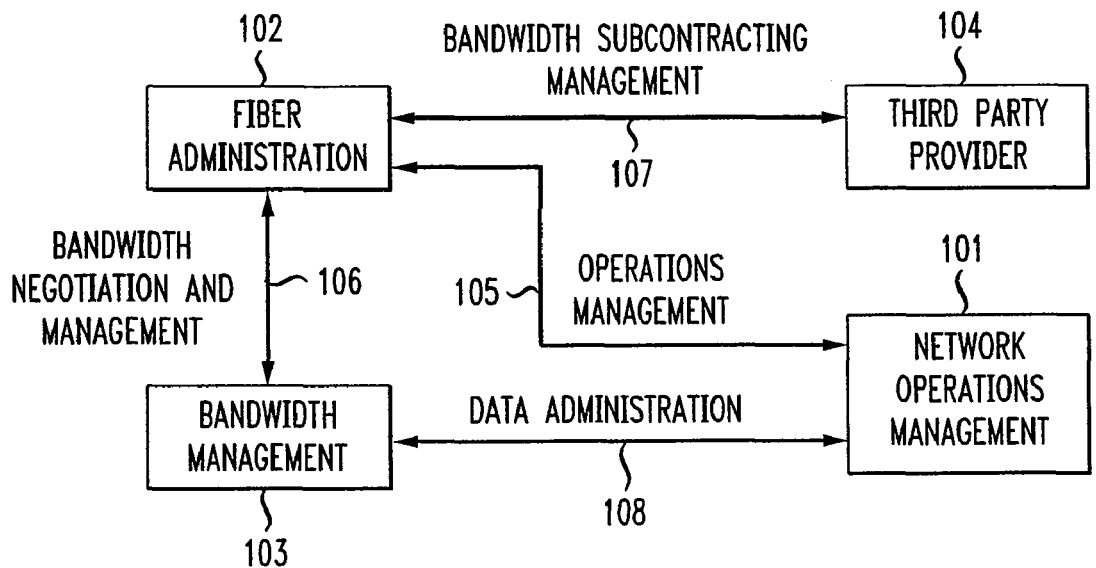
FIG. 1 is an illustrative block diagram of a first embodiment of the relationship between entities within a physical link carrier and entities of a service provider.

FIG. 1 shows a block diagram of the functional entities typically involved in the process of provisioning and maintaining an interconnected physical network, such as for example an optical fiber network, as described above. Specifically, referring to that figure, such typical functional entities include network operations management entity 101, fiber provider administration entity 102, bandwidth management administration entity 103 and third party providers 104. One skilled in the art will recognize that these entities represent departments or other such organizations within a service provider and/or carrier to perform various tasks associated with the provisioning and management of physical links in a network. Thus, as discussed above, the exchange of information between these entities is necessary to facilitate the creation and maintenance of links across physical networks controlled by the carriers. Specifically, as one skilled in the art will recognize, in order to provision bandwidth to provide service to customers, network operations management entity 101 typically initiates a request for physical links, such as optical fiber links managed by fiber administration entity 102. Fiber administration entity 102 and network operations management entity 101 then exchange operations management information 105, such as information related to the required links, such as bandwidth requirements and endpoints of the desired link. Such operations management information 105 may also include other information, obvious to one skilled in the art, necessary for the operation and maintenance of the links once the provisioning process is complete. Fiber administration entity 102, in turn, must communicate with both the carrier bandwidth management entity 103 as well as with any third party providers 104 to which bandwidth requirements have been subcontracted. The exchange of such information is necessary in order to negotiate the provisioning of the necessary bandwidth to ensure that any new provisioning of the physical links will not impact any existing bandwidth requirements across those links as well as for general bandwidth management purposes, such as ensuring the efficient use of bandwidth. Bandwidth management entity 103 and network operations management entity 101 also exchange administrative data 108 so that network operations management can remain apprised of the bandwidth used and available across the various physical links provisioned for use across the carrier network.

As one skilled in the art will recognize and as discussed above, the foregoing information exchanges have typically been conducted manually—for example, information is collected by individuals manually and is then forwarded from one of the entities discussed above to another entity. As a result, the aforementioned problems associated with inefficiency and degraded service to customers can occur.

Accordingly, the present inventors have developed a method for the automatic and secure ordering and modifying of physical links from carriers. In particular, the present inventors have invented a method for automatically collecting and making physical link and network management information available for on demand retrieval and exchange. This physical link and network management information may include information such as physical link characteristics as well as administrative information that can be used by a service provider to request quotes for the lease of a physical link, order/lease such a link, and modify the usage of the link. In a first embodiment, information related to a physical link and associated information useful for the network management of that link is transferred via an in-band signaling process. As used herein, and as is well-known in the art, the term in-band signaling is defined as the process of transmitting or exchanging control information over the same frequency channel as that used for operational data. The in-band exchange of such control information is typically accomplished via one or more protocols, e.g., that have been adopted by a standards body, in the same channel as the transmission of operational data such as, in the case of an Internet Protocol (IP) telephony network, voice telephony data. For example, control bits that are transmitted over the same frequency channel as such voice call information in an IP telephony network are referred to as being transmitted in-band. As one skilled in the art will recognize, well-known network management protocols such as the Simple Network Management Protocol (SNMP) may be used for such in-band transmissions.

Figure 2:
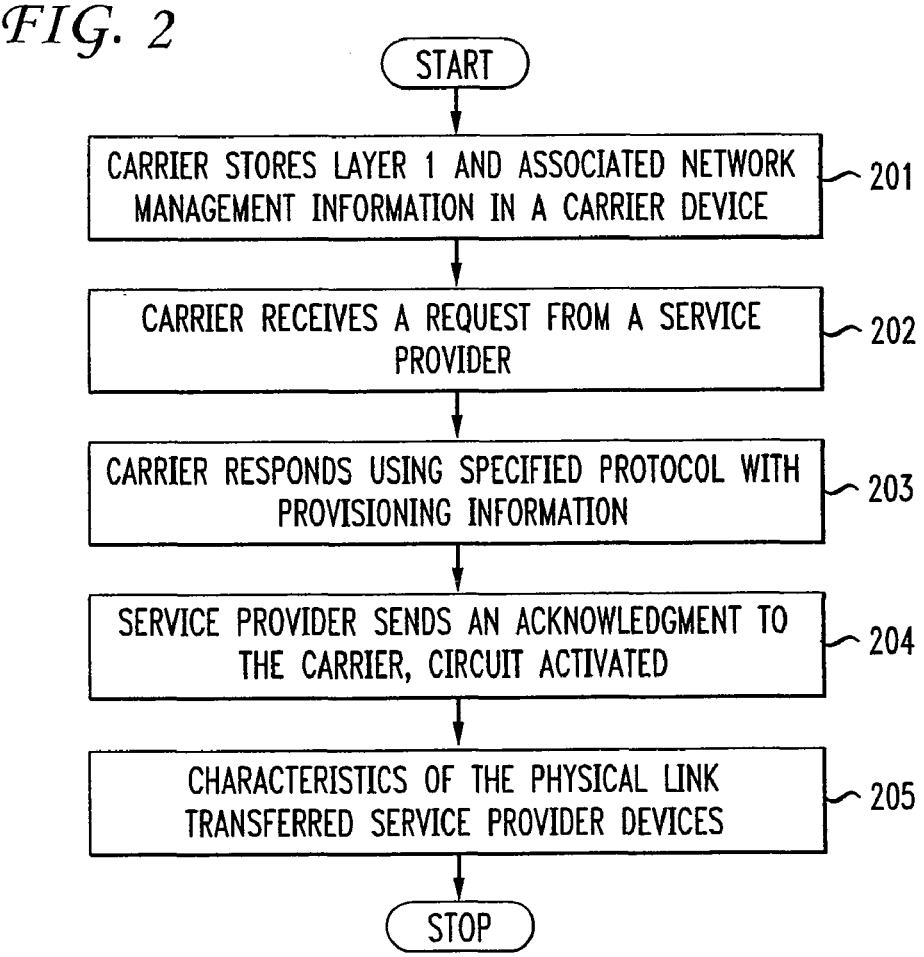
FIG. 2 is a flow chart of the steps of a method in accordance with an embodiment of the present invention.

FIG. 2 shows a method in accordance with the principles of the present invention whereby a service provider requests a physical link from a carrier. Referring to that figure, at step 201, a carrier stores layer 1 information and associated network management information, discussed herein below, regarding the physical links that it manages in a carrier device for managing circuits within the carrier network. At step 202, the carrier receives a request from a service provider. This request, also discussed in more detail herein below, illustratively contains information identifying the intended customer of the link as well as details regarding the service, such as the dates between which service is required and other information necessary to request the initiation of service over one or more physical links operated by the carrier. This request also illustratively informs the carrier which protocols to use to transfer the stored layer 1 information to the service provider. For example, in many cases the necessary information can be exchanged between the carrier and the service provider via well-known methods over a virtual circuit using a protocol at the layer 2 of the network. Alternatively, this information can be exchanged via a protocol at the layer 3 of the network, such as the well-known IP protocol or via a higher level protocol such as the well-known HyperText Transfer Protocol (HTTP) or SNMP, discussed above.

Next, at step 203, the carrier responds over the specified protocol at the specified layer of the network with provisioning information regarding the physical link characteristics, cost (illustratively based on predetermined rates) and network management information necessary for the service provider to manage service across those links and to request changes or maintenance to those links from the carrier. The specific types of information contained in such a request is discussed in more detail herein below. At step 204, the service provider sends an acknowledgment to the carrier and, illustratively, at this point the carrier activates the circuit for use by the service provider.

Once the service is activated, at step 205, characteristics of the physical link, such as endpoint network addresses, bandwidth capacity and other information as discussed herein below may be transferred using well-known methods illustratively to routers, multiplexers or switches of the service provider serviced by the physical link. Accordingly, this information or part of this information is then stored at the physical link endpoints within the service provider network and therefore, is readily available when a customer or the service provider requires that information. One skilled in the art will recognize that various commands may be used in an in-band signaling method to initiate various actions associated with the physical link. As one skilled in the art will also recognize, such commands would typically require consideration and adoption by a standards body for incorporation into the protocol selected to be used for the signaling described above at, for example, layer 2 or layer 3 of the network. Illustratively, an Initialize Physical Data Label (IPDL) command may be used by a carrier to initiate and load the aforementioned information at the routers, multiplexers or switches of the service provider as described above. Similarly, an Update Physical Data Label (UPDL) command could be send to update information at these devices. In addition, when a service provider installs a new device in the network, that service provider may transmit an illustrative Read Physical Data Label (RDPL) command to the carrier, thus informing the carrier of the new device. In response, the carrier could, for example, issue an IPDL command to that device to load the aforementioned information, as discussed above.

In a second embodiment, instead of exchanging information between a service provider and a carrier via an in-band method, as discussed above, information related to physical links and associated information is exchanged between a service provider and a carrier via an out-of-band method. One skilled in the art will recognize once again that the term out-of-band refers to exchanging control information on a separate channel or path from the operational channels of the network and outside of the operational protocols used on those operational channels. In particular, in accordance with this out-of-band method, the foregoing information is transmitted by a carrier to a central repository, such as a central database. This database is illustratively shared between carriers and the service provider and, for example, has an associated computer system adapted to receive information and store it in the database and respond to requests for information meeting various criteria, i.e., the characteristics of a physical link between two identified network addresses. Accordingly, this information is then readily available to a service provider when, for example, the provider wishes to request an additional physical link.

Figure 3:
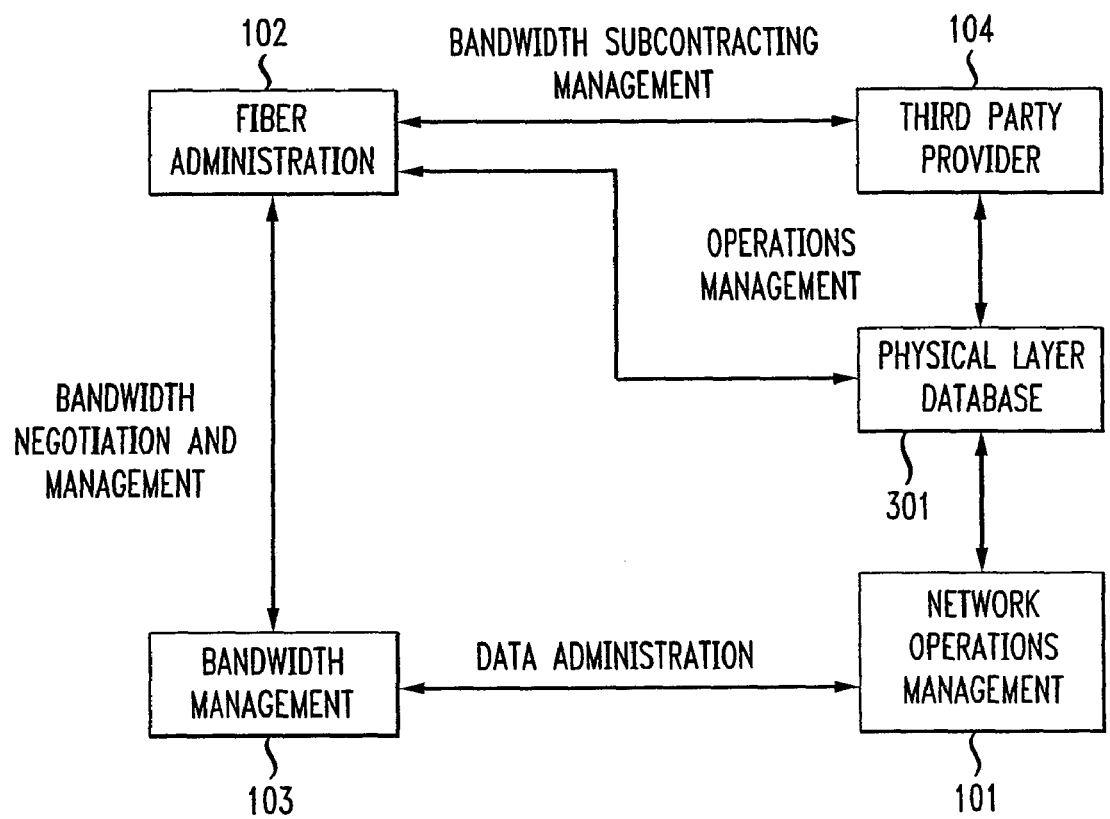
FIG. 3 is an illustrative block diagram of a second embodiment of the relationship between entities within a physical link carrier and entities of a service provider.

FIG. 3 shows an illustrative block diagram in accordance with the principles of the present invention whereby the functional entities involved in provisioning and maintaining an interconnected physical network automatically send physical link and network management data to such a database. Once stored, that information can be retrieved manually or automatically for use in provisioning physical links across carriers. Referring to FIG. 3, that figure once again shows the network operations management entity 101, fiber provider administration entity 102, bandwidth management administration entity 103 and third party providers 104, as shown in FIG. 1 and discussed herein above. In addition, FIG. 3 also shows central database 301 whereby information related to the physical layer of the network, i.e., the physical links, of the network. In accordance with the principles of the present invention, instead of manually requiring data exchanges directly between the various entities described above, each entity interfaces with database 301 to obtain required information, which is automatically updated with current information associated with each physical link. For example, instead of network operations management 101 of a service provider requesting the provisioning of a physical link from fiber administration entity 102 of a carrier, the network operations management 101 submits the request to, illustratively, a network node associated with database 301. One skilled in the art will recognize in light of the teachings herein that such a network node may be any node in the network adapted to receive such requests and interface with various network entities and store data received from those entities in database 301.

Figure 4:
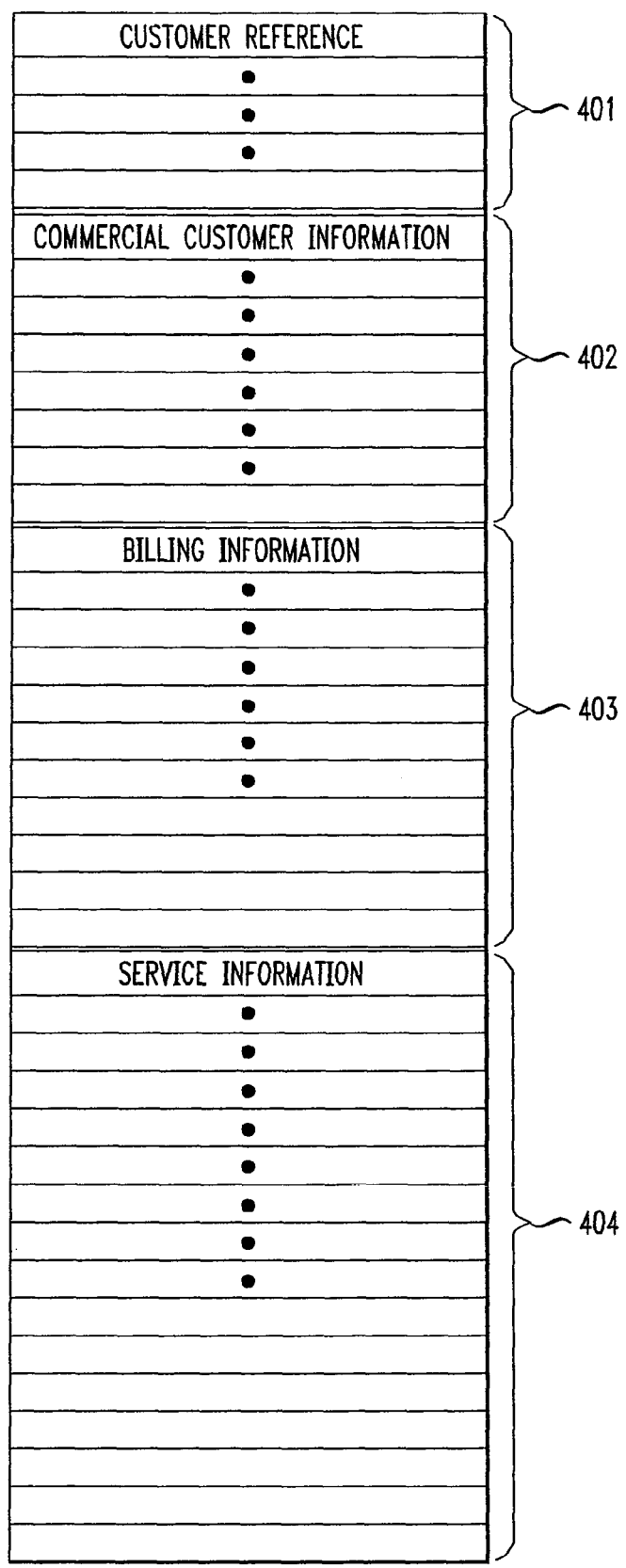
FIG. 4 shows illustrative fields of a request for the use of a physical link from a service provider to a physical link carrier.

FIG. 4 shows the illustrative format of a request that may be used by, for example, network operations management entity 101 in FIG. 3 of a service provider to request or update the provisioning of a physical link from fiber administration entity 102. This request may be sent from the service provider using either the in-band or the out-of-band methods described herein above. Specifically, if the service provider communications with the carrier via in-band methods, the request will be sent over via the aforementioned protocols to that carrier and responses from the carrier will, illustratively be sent via a return message. Alternatively, in the out-of-band method, the service provider may send the request to the system associated with shared database 301 of FIG. 3 and will receive a response, with information retrieved from that database. In either the in-band or out-of-band cases, the illustrative service provider request of FIG. 4 contains, for example, customer reference fields 401, commercial customer information fields 402, billing information fields 403 and service information fields 404. These fields are illustratively populated by a service provider with information obtained from a customer. Customer reference fields 401 may contain, for example, information such as a customer order number and/or a customer reference number associated with a designated customer for the link to be provisioned. Commercial customer information fields 402 may contain contact information associated with that customer. For example, the street address, telephone number, contact person and e-mail address of the customer may be provided in these fields. Billing information fields 403 may contain, for example, information necessary to produce bills to the customer, for example, once again, street address of the company, administrative billing contact of the customer, e-mail address and a description of the terms of the contract (e.g., lease period of physical link, monthly fee, etc). Finally, service information fields 404 may contain fields for installation status, the requested installation date, the physical locations from which the customer will be accessing the physical link, and technical points of contact at each of those locations. Fields 404 may also contain information associated with any optional services that a customer has requested in association with the leasing of the physical link such as any specifically requested routing or redundancy options.

Figure 5:
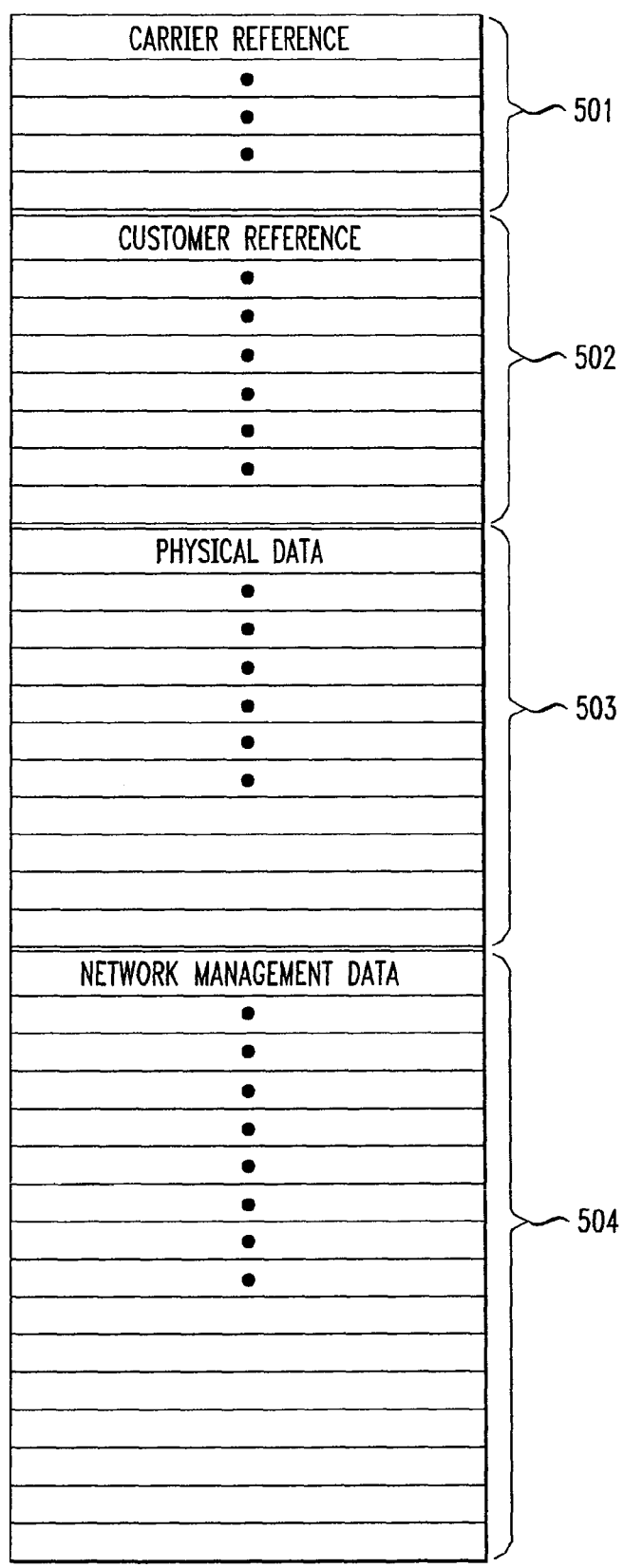
FIG. 5 shows illustrative fields of a response to the request of FIG. 4.

Once the request is received, a reply is generated and forwarded to the service provider. Once again, this response may contain information from the pre-populated data in the database 401 of FIG. 4 (in the case where out-of-band signaling is used) or, alternatively, may contain information directly from the carrier network (in the case where in-band signaling is used). In either case, FIG. 5 shows the format of an illustrative response in accordance with the principles of the present invention. Specifically, the illustrative response of FIG. 5 contains carrier reference fields 501, customer reference fields 502, physical data fields 503 and network management fields 504. As discussed, these fields are illustratively populated by information from a database that was populated by a carrier. Carrier reference fields 501 contain, for example, order reference number, customer reference number and committed delivery date. Customer reference fields 502 may include, for example, fields for customer order number and customer line reference (e.g., the order number and the reference number for the physical communication link assigned by the customer). Physical data fields 503 include specific information regarding the physical link itself, such as the contract type and circuit information. This information identifies, illustratively, the identification number of the circuit and whether the contract is for a full circuit or only a portion of a circuit. Physical data fields 503 may also include information about any tails that are to be leased through, for example, a third party provider. As one skilled in the art will recognize, the term tail is a well known term that refers to the relatively short portion of a physical line, such as fiber, that connects a customer to a main leased physical link. Physical fields 503 may also include the name of the carrier for all portions of the leased circuit. Once again, one skilled in the art will recognized that all portions of the circuit may be owned by a single carrier or, alternatively, different portions of the circuit may be owned by two or more carriers. This information is useful to identify the carrier responsible for the physical management of the physical link.

Network management fields 504 may include other information fields useful in managing the leased circuit at, for example, the network operations management entity 101 of FIG. 3. For example, network management fields 504 may include circuit status fields (e.g., whether the circuit is active or inactive, etc.). Fields 504 may also include fields for storing information regarding the bandwidth capacity of the physical link. These bandwidth capacity fields may also include information concerning the possible expansion of the link as well as which expansions would require hardware changes and which would not. Finally, network management fields 404 may include fields for transmitting contact information for the network operations entity of the carrier. These fields may include primary and alternative telephone numbers and may identify a particular point of contact.

One skilled in the art will recognize that the information in physical data fields 403 and network management fields 504 represents the type of information that a carrier will prepopulate into database 301 of FIG. 3. One skilled in the art will recognize that the information fields specifically referenced above are merely illustrative in nature and that it may be desirable to store many specific types of information related to the physical links as well as information useful for the network management of those links in that database. The storage of any such information at one or more central locations is intended to be encompassed by the principles described herein.

Figure 6:
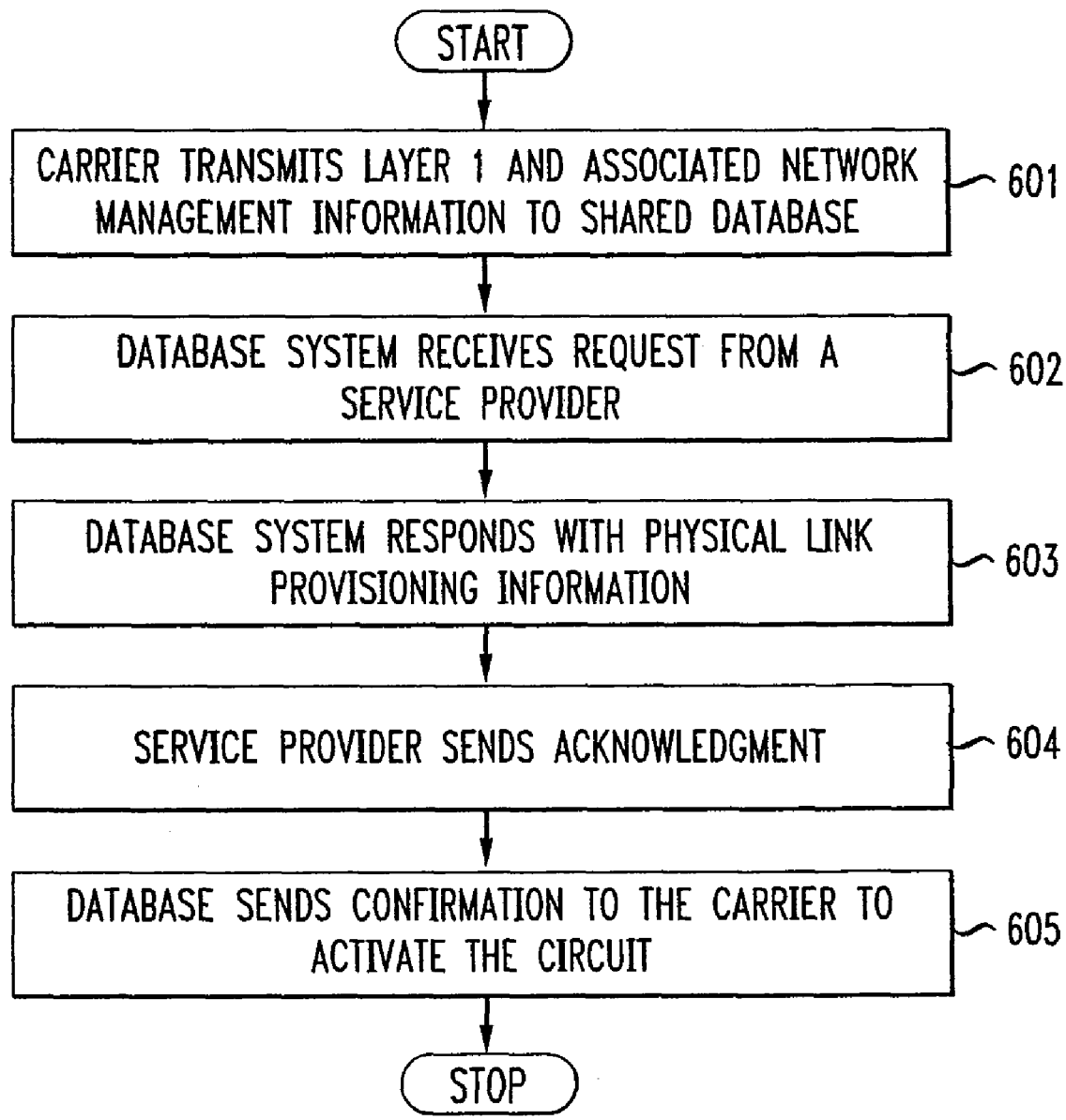
FIG. 6 shows the illustrative steps of a method in accordance with another embodiment of the present invention.

FIG. 6 shows a method in accordance with another embodiment of the present invention whereby a service provider sends a request to a database, such as database 301 in FIG. 3, to request the use of a physical link. Referring to that figure, at step 601, a carrier transmits layer 1 information and associated network management information, discussed herein above, regarding the physical links that it manages to a shared database in, for example, a service provider's network. As described above, a computer system associated with the database is adapted to receive, process and respond to requests for physical links using the information provided by the carrier. At step 602, the database system receives a request from a service provider. This request may be a request of the form illustrated in FIG. 4 and, once again, illustratively contains information identifying the intended customer of the link as well as details regarding the service, such as the dates between which service is required and other information necessary to request the initiation of service over one or more physical links operated by the carrier. Next, at step 603, the database system determines which available carrier physical links are available to satisfy the service provider's request and then responds with provisioning information regarding the physical link characteristics, cost, installation date (illustratively based on predetermined rates) and network management information necessary for the service provider to manage service across those links and to request changes or maintenance to those links from the carrier. The specific types of information contained in such a response is, once again, illustratively shown in FIG. 5 and is discussed herein above. At step 604, the service provider sends an acknowledgment to database system and, illustratively, at step 605 the database sends confirmation to the carrier to activate the circuit for use by the service provider.

One skilled in the art will recognize that the embodiments described above for requesting the use of physical links from a carrier and responding to those requests may be implemented using digital certificates. As is extremely well known, digital certificates are electronic files that are used to uniquely identify people, entities and resources over networks. They are typically based on equally well-known public-key cryptography, which uses a pair of keys (private and public key) for encryption and decryption. In the present embodiments, such a digital certificate may be attached to the message exchanges between the service provider and the carrier/shared database. As a result, the recipient of the message can easily verify the identity of the sender. Accordingly, the use of such certificates will provide a secure and convenient method for requesting quotes for providing a physical link, ordering such a link and modifying the usage of such a link and for verifying the identity of the requesting parties of such actions.

Figure 7:
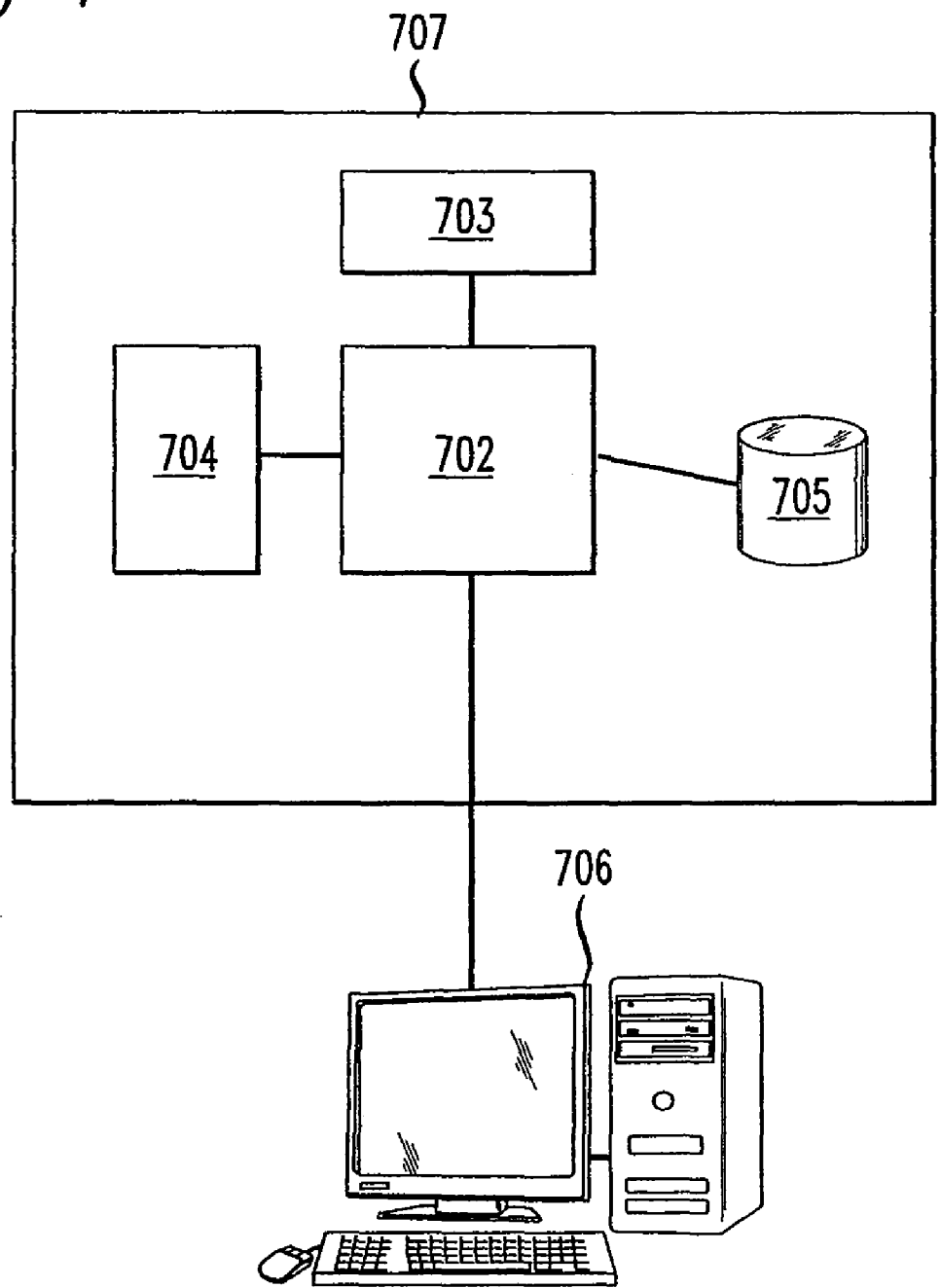
FIG. 7 shows a schematic diagram of a computer adapted to perform the steps of a computer program to receive requests from a service provider and to transmit responses for the purpose of provisioning physical links in accordance with the embodiments of the present invention.

FIG. 7 shows a block diagram of an illustrative computer system that is adapted to receive requests from a service provider, determine which physical links satisfy those requests, and to transmit responses to the service provider containing information related to those physical links in order to provision the links for the service provider. Referring to FIG. 7, system 707 may be implemented on any suitable computer adapted to receive, store and transmit data such as the aforementioned physical link information. Illustrative system 707 may have, for example, a processor 702 (or multiple processors) which controls the overall operation of the system 707. Such operation is defined by computer program instructions stored in a memory 703 and executed by processor 702. The memory 703 may be any type of computer readable medium, including without limitation electronic, magnetic, or optical media. Further, while one memory unit 703 is shown in FIG. 7, it is to be understood that memory unit 703 could comprise multiple memory units, with such memory units comprising any type of memory. System 707 also comprises illustrative network interface 704 for use in, among other functions, collecting physical link information and forwarding that information to a service provider in response to requests for the use of physical links in a network. System 707 also illustratively comprises a storage medium, such as a computer hard disk drive 705 for storing, for example, data and computer programs adapted for use in accordance with the principles of the present invention as described hereinabove. One skilled in the art will recognize that flash memory may preferably be used in some implementations in place of hard disk drive 705. Finally, system 707 may also have illustrative terminal 706 having, illustratively, keyboard 708 and monitor 709 for inputting information and displaying results of the foregoing calculations. One skilled in the art will recognize that system 707 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for provisioning a physical link to a service provider comprising:
   receiving a request from a service provider for the use of at least a portion of a physical link in a carrier network, said request comprising a first digital certificate;
   retrieving physical link characteristic information and network management information associated with said physical link;
   transmitting a response to said service provider via a protocol at a predetermined layer in said network between said carrier and said service provider, said response comprising said physical link characteristic information and said network management information, said response further comprising a second digital certificate; and
   provisioning said physical link to said service provider.

2. The method of claim 1 further comprising:
   transmitting said physical link information and network management information to a plurality of devices in said service provider network.

3. The method of claim 2 wherein said plurality of devices comprises devices at a plurality of endpoints in said service provider network, said endpoints associated with endpoints of said physical link.

4. The method of claim 1 wherein said step of transmitting comprises transmitting said physical link information and network management information to each endpoint of a physical link in said service provider network.

5. The method of claim 1 wherein said physical link characteristics comprise characteristics of said physical link at a physical layer in said carrier network.

6. The method of claim 1 wherein said request comprises information identifying said protocol.

7. The method of claim 6 wherein said protocol comprises an in-band protocol.

8. The method of claim 6 wherein said protocol comprises a protocol at layer 2 of said network between said carrier and said service provider.

9. The method of claim 6 wherein said in-band protocol comprises a protocol at layer 3 of said network between said carrier and said service provider.

10. The method of claim 1 wherein said step of retrieving comprises retrieving said physical link characteristic information and said network management information from a shared database shared by said carrier and said service provider.

11. The method of claim 10 wherein said physical link characteristic information and said network management information is transmitted to said service provider via out-of-band signaling methods.

12. An apparatus for provisioning a physical link to a service provider comprising:
   means for receiving a request from a service provider for the use of a physical link in a carrier network, said request comprising a first digital certificate;
   means for retrieving physical link characteristic information and network management information associated with said physical link;
   means for transmitting a response to said service provider via a protocol at a predetermined layer in said network between said carrier and said service provider, said response comprising said physical link characteristic information and said network management information, said response further comprising a second digital certificate; and
   means for provisioning said physical link to said service provider.

13. The apparatus of claim 12 further comprising:
   means for transmitting said physical link information and network management information to a plurality of devices in said service provider network.

14. The apparatus of claim 13 wherein said plurality of devices comprises devices at a plurality of endpoints in said service provider network, said endpoints associated with endpoints of said physical link.

15. The apparatus of claim 12 wherein said physical link information and network management information are retrieved from a carrier device in said carrier network, said carrier device adapted to store information associated with a plurality of physical links in said carrier network.

16. The apparatus of claim 12 wherein said means for transmitting comprises means for transmitting said physical link information and network management information to each endpoint of a physical link in said service provider network.

17. The apparatus of claim 12 wherein said physical link characteristics comprise characteristics of said physical link at a physical layer in said carrier network.

18. The apparatus of claim 12 wherein said request comprises information identifying said protocol.

19. The apparatus of claim 12 wherein said means for retrieving comprises means for retrieving said physical link characteristic information and said network management information from a shared database shared by said carrier and said service provider.

20. The apparatus of claim 19 wherein said means for transmitting comprises means for transmitting said physical link characteristic information and said network management information to said service provider via out-of-band.

* * * * *